Feb. 10, 1953 H. M. PATCH 2,627,760
POWER DIVIDING DIFFERENTIAL
Filed Jan. 10, 1949 3 Sheets-Sheet 1
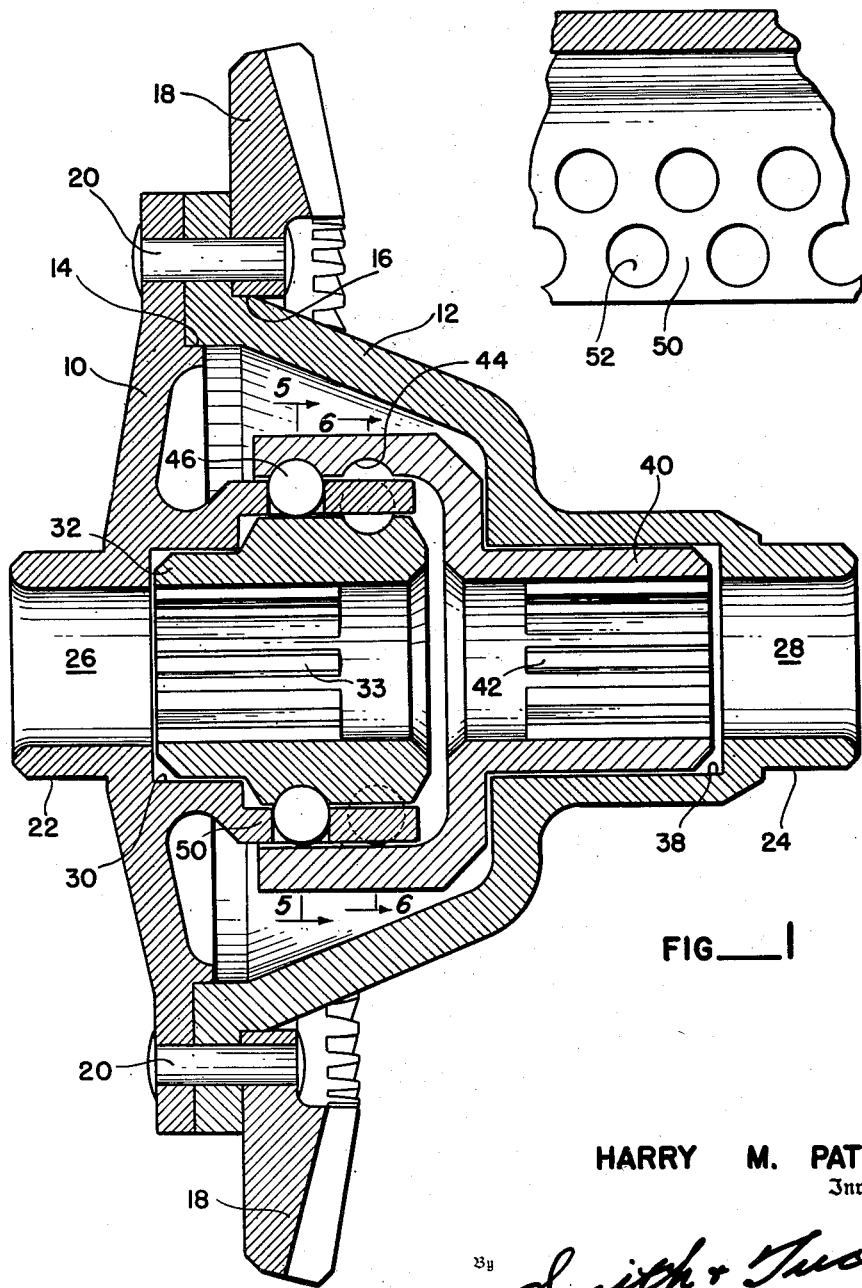
HARRY M. PATCH
Inventor
By Smith + Tuck
Attorneys

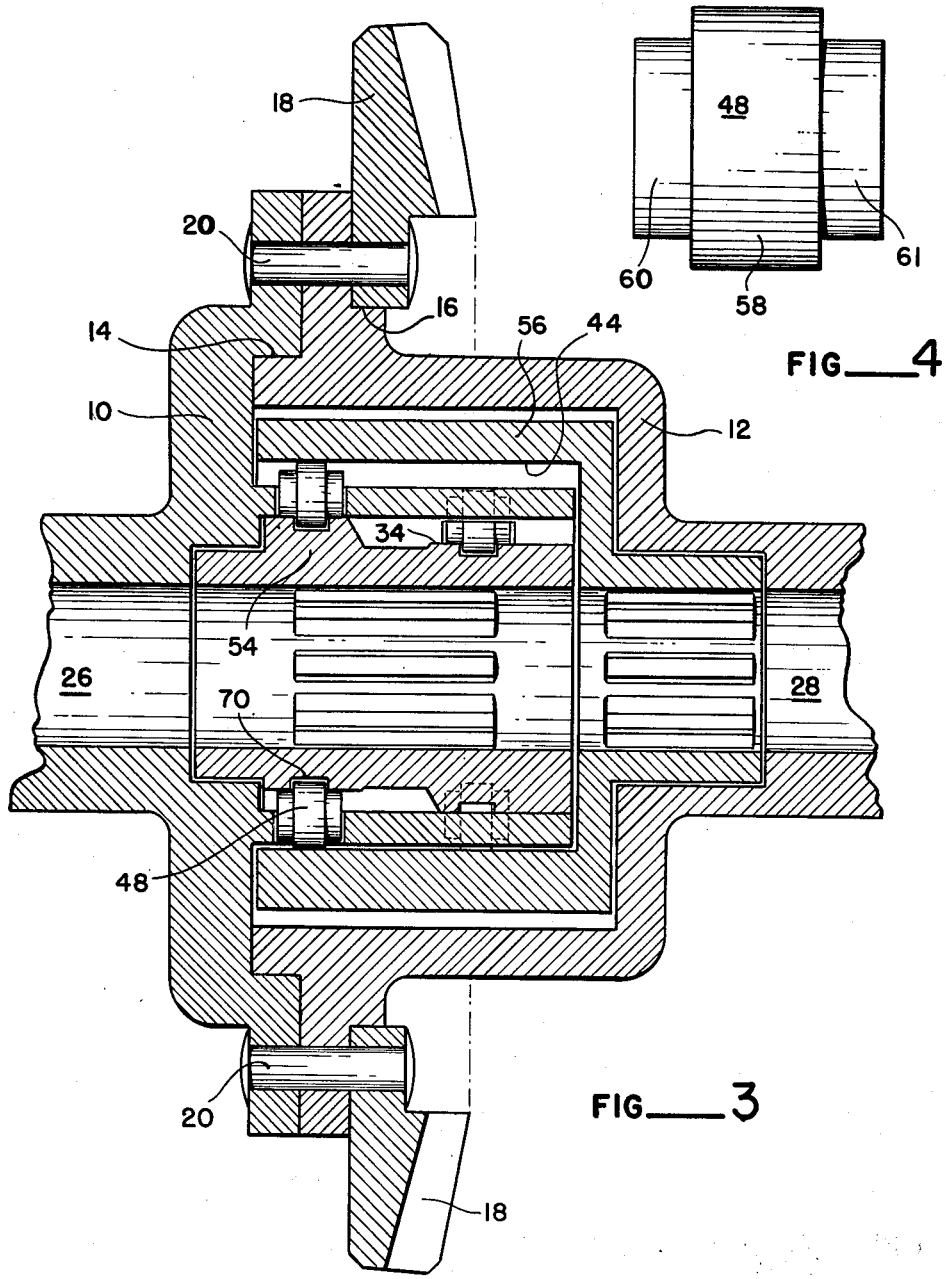

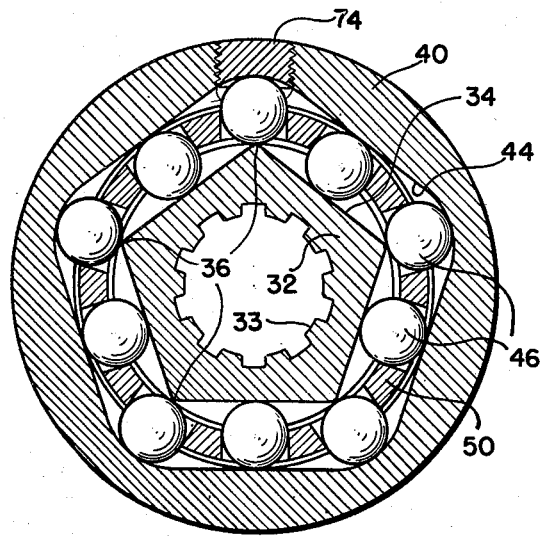
FIG__5
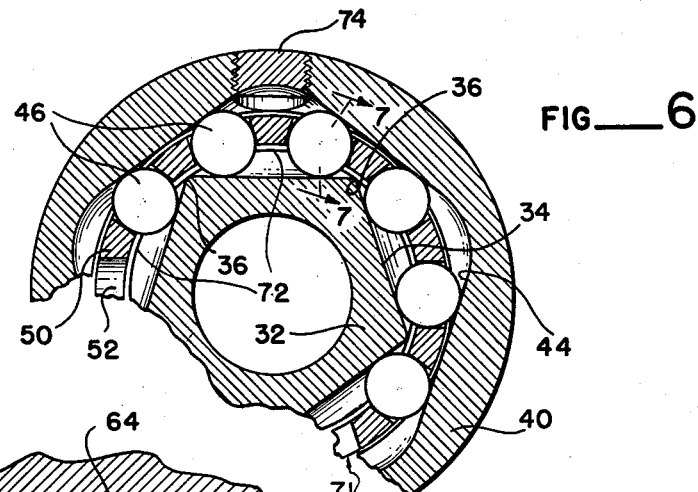
FIG__6
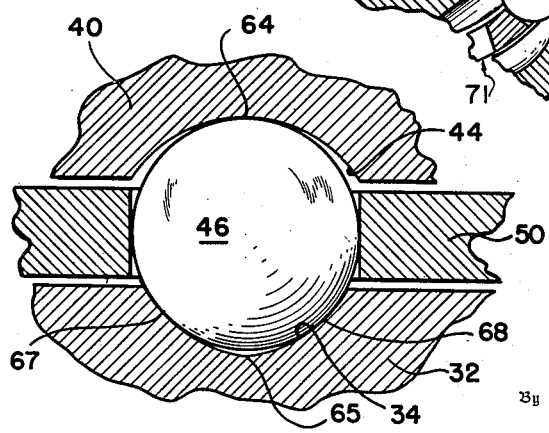
FIG__7
HARRY M. PATCH
Inventor

Patented Feb. 10, 1953

2,627,760

UNITED STATES PATENT OFFICE 2,627,760

POWER DIVIDING DIFFERENTIAL

Harry M. Patch, Seattle, Wash.

Application January 10, 1949, Serial No. 70,019

6 Claims. (Cl. 74—650)

My present invention relates to differential drive means, such as are used in automotive vehicles, and more particularly to a differential which does not use the ordinary differential gearing, but uses in place thereof, a plurality of balls or rollers disposed between angularly arranged cam surfaces. The result of this construction is a power dividing mechanism which is of particular value where vehicles frequently encounter a loss of traction under one of the driving wheels.

In the usual transmission, the differential action is obtained through the use of spur, bevel, or spiral pinions, which are carried about by the driven gear. These pinions normally mesh with either bevel or spur gears, which are secured in driving relationship to the opposite driving axles. Under such conditions, if one wheel loses traction and spins, there is no forward movement of the vehicle, and actually the differential mechanism serves as a step-up gearing, which will spin the slipping wheels faster than the two wheels would have turned had they been driven together. It is to overcome this condition that I have provided my power dividing differential mechanism.

In the past, various arrangements have been provided with the idea of providing a locking differential, or in an attempt to achieve a division of power under these conditions. These various arrangements have met with various degrees of success, but the majority observed have been so arranged as to produce their effect by increasing friction, and this in use, creates wear that tends to change the operating characteristics of the device. In my present construction I believe that I have overcome this deficiency by providing that the connecting members between the two cam surfaces of my mechanism are free to revolve on an axis parallel to the surfaces of the two cam members. Long extended use has proven that the hardened balls or rollers, when operated in suitably constructed races, can be expected to maintain their operating characteristics over their entire life.

The principal object of my present invention therefore, is the provision of a power dividing differential which achieves its differential action without the use of gearings, yet, will never operate to place all the power flow of the system on one wheel should it become devoid of traction.

A further object of my present invention is to produce a differential arrangement in which the power transmitting media is a rolling member, so that the differential action will be obtained with the very minimum of fraction.

A further object of my present invention is to provide a power dividing differential in which the factory determined action of the mechanism will not change, due to the fact that there is no sliding friction to cause any excessive wear of the essential parts.

A further object of my power dividing differential is to provide a replacement unit which will have ample capacity within the physical dimensions formerly occupied by a conventional type of differential.

A further object of my power dividing differential is to provide a mechanism which can be very economically constructed and one which will have an expected life in access of the life of the vehicle in which it is installed.

Further objects, advantages and capabilities will be apparent from the description and disclosure in the drawings, or may be comprehended or are inherent in the device.

In the drawings:

Figure 1 is a cross sectional view taken in the plane including the opposite driving axles.

Figure 2 is a fragmentary view of the ball retainer, with a portion of the same shown in section.

Figure 3 is a sectional view taken in the same sense as Figure 1, but showing a desirable modification of my construction wherein rollers having a central portion of increased diameter and end bearing portions of reduced diameter are used.

Figure 4 is a face view of one of my two diameter rollers.

Figures 5 and 6 are cross sectional views taken along the lines 5—5 and 6—6 respectively of Figure 1.

Figure 7 is a fragmentary sectional view on an enlarged scale in which the race-ways are formed within the exterior and interior cam elements and the association of the revolving power transfer balls used in one form of my differential.

Referring more particularly to the disclosure in the drawings, my differential is housed in a differential housing composed of two major members as 10 and 12; these are adapted for inter-locking engagement as at 14 and are machined as at 16 to form a seat for the differential or drive ring gear 18. Experience has shown it best to secure the housing members and the ring gear 18 together as by a plurality of substantial rivets as 20. These rivets, normally must accept the driving torque of the ring gear and must hold the assembly in tight engagement so as to maintain the proper adjustment of the ring gear 18. The housing revolves upon anti-friction bearings that seat on machined seat at 22 on housing member 10, and at 24 on housing member 12. These bearings are normally so mounted that they can be adjusted along the axis of the axle shaft so as to insure that ring gear 18 will suitably mesh with the driving pinion, which is not shown. The bearing seats 22 and 24 are bored out to form the axle receiving bores as 26 and 28. While I have shown my housing members as solid, if the lubrication of the vehicle in which they are to be used requires it, they can be webbed so as to provide for the free ingress of grease for lubricating the various parts.

Housing member 10 is counter-bored at 30 to provide a concentric seat for the inner cam member 32. This member is splined as at 33 to receive one of the driven axles. Its outer surface is formed as a multi-faced cam, after the showings of Figures 5 and 6. These cams are normally provided with the straight portions 34 and the corners formed by the meeting of these portions are rounded off as at 36.

Housing member 12 is counter-bored at 38 to provide a trunnion seat for the outer cam member 40. This cam member has its hub portion splined at 42 to receive the second driven axle. The outer cam member 40 has an increased diameter on its inner portion so as to provide the internal cam surface 44. The number of the cam surfaces on the inner cam member 32 and the outer cam member 40, as will be noted in the illustration Figures 5 and 6, are the same in number, the exact number being a matter of design. It has been found desirable to have a reasonable number of these surfaces in order that a relatively large number of the rolling contact or wedging members, as the balls 46 or the rollers 48, may be engaged when driving loads come upon them, rather than have only one or two of these units carrying all the load. On the other hand it is found that with the fewer the number of the cam surfaces as 34 and 44, it is possible to employ rollers or balls of larger diameter and the angle of these surfaces becomes more favorable as a lesser number is used. In practice, I have found that five surfaces on each of the inner and outer cam members, as I have illustrated, is probably the best compromise choice.

It will be noted from Figures 1 and 3 that I have illustrated two annular rows of balls in Figure 1 and two annular rows of rollers in Figure 3. Two such rows seem to be a good working arrangement; a single row can be used, if the cam faces of the inner and outer cams are unequal in number, and if it were not for the desirability of keeping the unit within the overall dimension of the conventional gear type differential, any number of rows could be employed. However, with each row of balls, or rollers, separate inner cam surface sets 34 should be employed, and these should have their angled faces staggered in such a way that the number of rolling units in working relationship can be increased. Cam surfaces 44 of the outer cam members 40 or 56 may extend over both rows of the inner cams.

Disposed concentrically with, and in between the inner and outer cam surfaces, I employ a ball or roller positioning cage. In Figure 2 I have shown such a cage 50, as employed when balls, as 46, are used, and it will be noted that I have employed the two rows in a staggered relationship with each other. The same general arrangement is employed when rollers are used, except the openings 52, which in Figure 2 are shown as cylindrical, but, of course, conform to the shape of the roller used. Cage 50 is formed, preferably, as part of housing member 10, under certain conditions it may be formed as a separate unit, but in such instance, it must be fixedly secured to one of the housing members, and with the arrangement shown in Figures 1 and 3, it follows that it is most convenient because of the outer cam member 40 interfering, to form this as part of housing member 10. The ball or roller cage should be formed cylindrical with a cylindrical bore, so as to provide a wall thickness sufficient to pass through the minimum clearance existing between the inner and outer cam surfaces. This relationship is shown in Figures 5 and 6, and in Figure 6 particularly, it is clear that the minimum dimension between the cam surfaces occurs when a corner of the inner cam member is opposite the center of one of the straight cam surfaces 44.

Conditions have been found where it is desirable to use rollers instead of balls. Such a roller, in its preferred form is shown in Figure 4, and the manner of use of the same is illustrated in Figure 3. In general, all the corresponding parts of Figure 3 are comparable to similar parts of Figure 1. However, in this instance, in order to provide for a rolling contact between the roller and the two cam surfaces or bearing paths, as the cam surfaces of the inner cam member 54 and the cam surfaces of the outer cam member 56, I provide that the roller have a central portion 58 forming a greater circumference and two end bearing portions of reduced diameter as 60 and 61 forming smaller circumferences. The ratio of these diameters are equal to the ratio of the diameters of the cam surfaces formed on cam members 56 and 54.

When this relationship is maintained, there will be no slipping or sliding of the rollers, as they engage the two cam surfaces, one of which being of greater radius than the other, has normally a greater peripheral speed.

Referring to Figure 7, I have made provisions to maintain the same differential action, so as to provide that ball 46 will, at all times, roll on both the inner cam surfaces 34 and the outer cam surfaces 44. Here again, the outer cam surface or bearing path is on a greater diameter and has a correspondingly greater peripheral speed. I have provided that on the outer ball race-way sufficient relief be provided so that the ball contacts, at a point 64, which is at the maximum height or circumference of the ball. I then provide, on the inner ways, relief at 65, so that the ball will bear at two bearing points or portions, as 67 and 68. The proportioning here is such that the vertical distance from these points of contact, 67 and 68, to a horizontal plane passing through the center of ball 46, will form a proportion with the distance from that plane to point 64, that will be equal to the ratio of the length of the path of travel of ball 46 on cam surface 34 to the length of the path of travel of ball 46 on cam surface 44.

Referring again to Figure 3, it will be noted that only the major diameter or circumference portion of the roller 58 will bear on the inner surfaces or bearing path of cam member 56, and that a relief is provided at 70, so that portion 58 will not bear on the inner cam member 54, but that the load will be carried by the reduced diameter portions 60 and 61.

It is to be noted, that the balls and rollers ride in grooves through most of their travel, the lips 71 of the grooves of inner cam surfaces 34 are of maximum height at the midpoint of the flats, as 72, and at a minimum at the cam corners as at 36. Plugs are provided at 74 as a convenience in assembly of the balls or rollers.

In operation, the driving force is applied to the ring or bevel gear 18, which is rotated in a desired direction, carrying with it cage 50 and the balls or rollers positioned by it. The balls or rollers are engaged between the cam surfaces 34 and 44 of the cam members.

In normal operation, as a vehicle is being driven on a straight road where both driving wheels have equal footing, the turning effort applied to ring gear 18 will be transmitted equally and at the same rotative speed to each of the driving axles, which are engaged with the spline portion 33 of the inner cam member 32, and the spline section 42 of the outer cam member 40. This action is the same when referred to either Figure 1 or Figure 3, as all the operating principles are identical in the modified form.

If a turn is to be made, and both wheels have equal footing, then the wheel on the outside of the curve must travel faster than the wheel on the inside of the curve. Assuming, as viewed in Figures 1 or 3, that the wheel on the outer side of the curve is on the left side, as viewed, under such conditions, with both wheels in firm contact with the ground, the endeavor will be to drive the inner cam 33 faster than the outer cam 42. Now the ball cage 50, or the roller cage, in the modified form, is being turned at the uniform rate under the driving effort of the ring gear 18. Under the conditions imposed, the balls are allowed to roll in the races, moving radially as one race recedes and the other advances in equal amount relative to the ball cage. The balls in one or the other cam race are always in driving engagement when rolling in rounding a curve.

In action, the ball cage is rotated by the driven gear. This cage carries the balls which are in contact with the outer cam on one side, the inner cam on the other. One of these cams is double, that is, has two cam tracks or races, with the flats of one in line with the peaks of the other. In this case it is the inner cam so arranged. This presents one cam race in an angular position relative the corresponding cam race of the outer cam, so that the balls carried by the ball cage are not free to move with the cage, but jam between said races, and force the cams to rotate in unison with the cage. When the inner cam race is in a parallel position relative the corresponding outer cam race, the balls are free, do not jam between the inner and outer race, so do not drive the cams.

On partial loss of traction with one wheel, the cam driving that wheel can not be driven faster than the other one, as the drive would have to come through the cage, to the balls, to the cam, whose wheel retained full traction, with a reaction on the balls from this cam in a radial movement against the opposing cam, to force it to move ahead of the driving cage. This is impossible because the slight load on the wheel with the lesser traction, sets up sufficient resistance in its cam, to prevent the radial action of the ball, from forcing this cam to turn ahead of driving cage, and the cam with its wheel with a full traction. This locking effect may be varied by changing the number of sides of the regular polygon. Also, the faces may be curved rather than straight. Therefore, both cams and both wheels are driven.

It is believed that it will be clearly apparent from the above description and the disclosure in the drawings that the invention comprehends a novel construction of a power dividing differential.

Having thus disclosed my invention, I claim:

1. In a power dividing differential of the type having positioned therein an inner cam member, an outer cam member, and a cage, all disposed to rotate about the same axis of rotation, said outer cam member being positioned outside of said inner cam member and said cage being positioned between said cam members, the improvement, comprising: said outer cam member having a plurality of inside cam surfaces and said inner cam member having a plurality of outside cam surfaces positioned facing the cam surfaces of said outer cam member, said cage having a plurality of openings therein and there being a plurality of revolvable wedging members positioned in said openings; each revolvable wedging member having a bearing portion of greater circumference and a bearing portion of smaller circumference; said inside cam surfaces having a bearing path formed to only contact each revolvable wedging member at said bearing portion of greater circumference, and said outside cam surfaces having a bearing path formed to only contact each revolvable wedging member at said bearing portion of smaller circumference; and the relative lengths of said paths and said circumferences being substantially of such proportions that the ratio of lengths of said bearing portion of greater circumference to said bearing path of said inside cam surfaces is equal to the ratio of lengths of said bearing portion of smaller circumference to said bearing path of said outside cam surfaces.

2. The subject matter of claim 1 in which said revolvable wedging members are stepped rollers.

3. The subject matter of claim 1 in which said revolvable wedging members are balls.

4. The subject matter of claim 1 in which said bearing path of said outside cam surfaces is formed by a groove in the path of said revolvable wedging members, the bearing portion of greater circumference of each revolvable wedging member riding in said groove without contact and the edges of said groove forming the bearing path of said outside cam surfaces contacting the bearing portion of smaller circumference of each revolvable wedging member.

5. In a power dividing differential of the type having positioned therein an inner cam member, an outer cam member, and a cage, all disposed to rotate about the same axis of rotation, said outer cam member being positioned outside of said inner cam member and said cage being positioned between said cam members, said cage having a plurality of parallel rows of openings therein, said inner cam member having a plurality of outside cam surfaces and said outer cam member having a plurality of inside cam surfaces, there being a set of said inside cam surfaces for each row of openings in said cage, and the sets of inside cam surfaces being staggered one with another, the improvement, comprising: a plurality of rows of balls in said opening; and said inner cam member having a groove in said outside cam surfaces in the path of each row of balls, the walls of the grooves being curved and the grooves being so shaped that the balls contact only the upper portion of said grooves, the ratio of the length of the path of travel of each ball on the portion of said groove on which it bears relative to the length across the bearing portion of the ball contacting said groove being substantially equal to the ratio of the length of the path of travel of each ball on the portion of said inside cam surfaces on which it bears relative to the length across the bearing portion of the ball contacting said inside cam surfaces.

6. In a power dividing differential of the type having positioned therein an inner cam member, an outer cam member and a cage, all disposed to rotate about the same axis of rotation, said outer cam member being positioned outside of said inner cam member and said cage being positioned between said cam members, said cage having a plurality of parallel rows of openings therein, said inner cam member having a plurality of outside cam surfaces and said outer cam member having a plurality of inside cam surfaces, there being a set of said inside cam surfaces for each row of openings in said cage, and the sets of inside cam surfaces being staggered one with another, the improvement, comprising: a plurality of rows of rollers in said openings, each roller being stepped with a portion of smaller diameter at either end and a portion of greater diameter intermediate the ends; and said inner cam member having a groove in said outside cam surfaces in the path of each row of rollers, the grooves being so shaped that the intermediate portion of greater diameter of said rollers do not contact the bottom of said grooves, the bearing contact being between the portions of smaller diameter of said rollers and the surfaces of said outside cam surfaces adjacent said grooves, the ratio of the average diameter of the bearing surfaces of said outside cam surfaces adjacent said grooves relative the diameter of said portion of smaller diameter of each roller being substantially equal to the ratio of the average diameter of the bearing surfaces of said inside cam surfaces relative to the diameter of said portion of greater diameter of each roller.

HARRY M. PATCH.

REFERENCES CITED

The following references are of record in the file of this patent:

UNITED STATES PATENTS

| Number | Name | Date |
|---|---|---|
| 1,158,336 | Valentine | Oct. 26, 1915 |
| 1,336,950 | Ford | Apr. 13, 1920 |
| 1,390,641 | Richardson | Sept. 13, 1921 |
| 1,612,954 | Trbojevich | Jan. 4, 1927 |
| 1,689,285 | Knab | Oct. 30, 1928 |
| 1,857,978 | Robbins | May 10, 1932 |
| 1,946,358 | Porsche | Feb. 4, 1934 |

FOREIGN PATENTS

| Number | Country | Date |
|---|---|---|
| 143,573 | Great Britain | Feb. 24, 1921 |
| 592,313 | Great Britain | Sept. 15, 1947 |